United States Patent

[11] 3,587,102

| [72] | Inventor | Watson P. Czerwinski<br>Shrewsbury, N.J. |
|---|---|---|
| [21] | Appl. No. | 889,499 |
| [22] | Filed | Dec. 31, 1969 |
| [45] | Patented | June 22, 1971 |
| [73] | Assignee | The United States of America as represented by the Secretary of the Army |

[54] HELICOPTER SKID ANTENNA
6 Claims, 4 Drawing Figs.

[52] U.S. Cl. .................................. 343/708,
343/744, 343/788, 343/803
[51] Int. Cl. .................................. H01q 1/28
[50] Field of Search .......................... 343/705,
708, 744, 788, 803, 908

[56] References Cited
UNITED STATES PATENTS
2,518,843  8/1950  Wehner .................. 343/708

*Primary Examiner*—Eli Lieberman
*Attorneys*—Harry M. Saragovitz, Edward J. Kelly, Herbert Berl and Gordon W. Kerr ABSTRACT: The struts which are disposed perpendicular to the roll axis of a helicopter for supporting the landing skids thereof are insulated from the helicopter fuselage. One of the struts has an antenna feed at its center, whereby the entire landing gear assembly functions as a folded dipole antenna or a loop antenna, depending on the operating frequency.

PATENTED JUN22 1971 3,587,102

INVENTOR,
WATSON P. CZERWINSKI

BY: Gordon W. Kerr,
Harry M. Saragovitz,
Edward J. Kelly &
Herbert Berl    ATTORNEYS

HELICOPTER SKID ANTENNA

The invention described herein may be manufactured, used, and licensed by or for the Government for governmental purposes without the payment to me of any royalty thereon.

This invention relates to an antenna for a helicopter and more particularly to the use of the skid-type landing gear of a helicopter as an antenna in the HF or VHF regions. Such a skid-type landing gear can be easily converted to form an antenna by insulating it from the helicopter body and properly exciting it. There are many advantages to such a combination antenna-landing gear. An antenna of large dimensions and hence large bandwidth and relatively low resonant frequency is obtained with little or no added aerodynamic drag or weight. The struts which support the skids are approximately orthogonal to the helicopter roll or longitudinal axis and hence if these struts are utilized as the active radiators, a fair degree of electrical isolation from resonances of the fuselage or other antennas is obtained. Another important consideration is that a helicopter with such an antenna may be used as an airborne command post for transmitting orders to ground forces below or as an airborne retransmission relay, and its clean silhouette will not reveal its mission to the enemy below.

It is thus an object of the invention to utilize the landing gear of a helicopter as an antenna.

Another object of the invention is to provide a wide bandwidth, high efficiency loop antenna operating in the high frequency region for a helicopter.

A further object of the invention is to convert the skid-type landing gear of a helicopter into a loaded, folded dipole or loop antenna.

A further object of the invention is to provide an antenna for a helicopter which is not recognizable as such.

These and other objects and advantages of the invention will become apparent from the following detailed description and drawings, in which.

Figure 1:
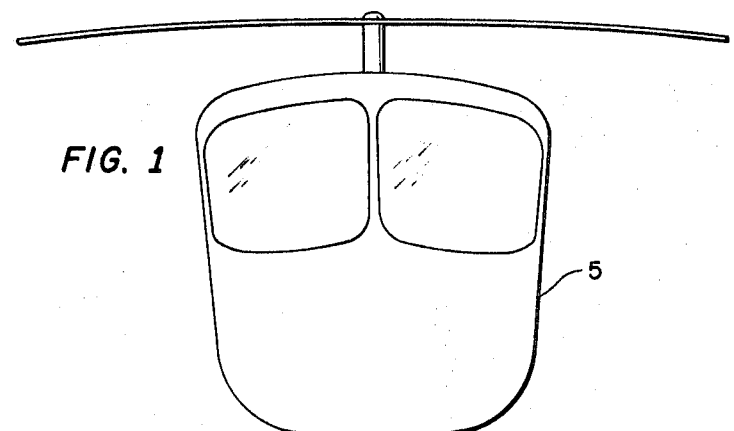
FIGS. 1 and 2 are front and side views respectively of a helicopter which incorporates the present invention.
Figure 2:
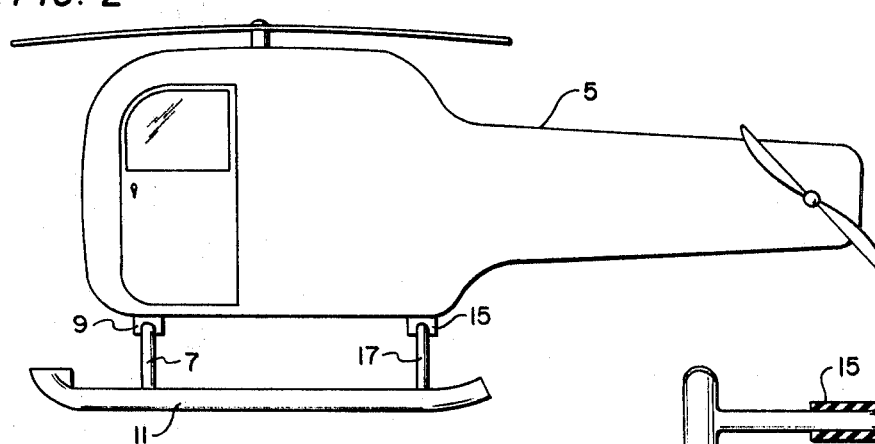
Figure 3:
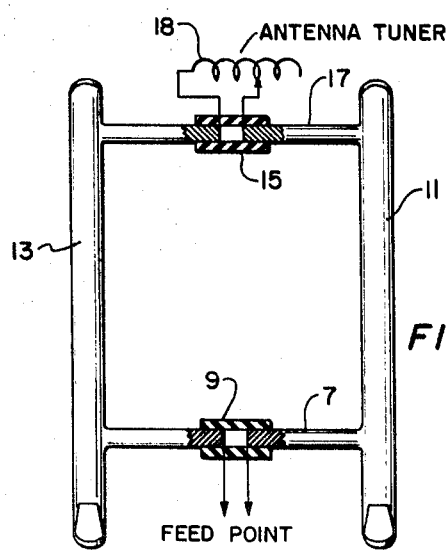
FIG. 3 is a plan view of the modified landing gear showing how it can be excited as a folded dipole antenna or a loop antenna.
Figure 4:
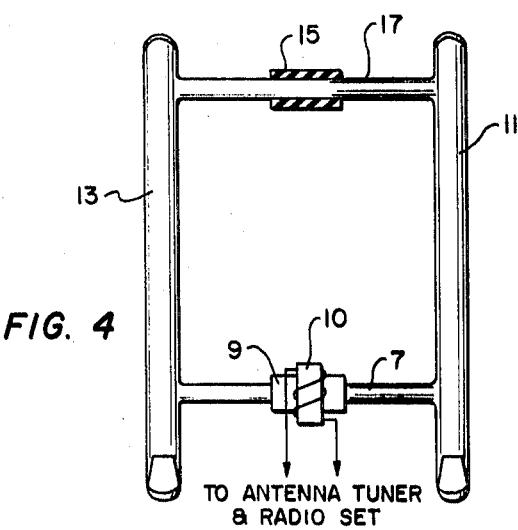
FIG. 4 is an alternate embodiment of the antenna of FIG. 3.

The helicopter of FIGS. 1 and 2 include a fuselage or body 5 and a skid-type landing gear comprising a pair of generally arcuate or bowed struts 7 and 17 which support a pair of skids 11 and 13. The Army's HU-1B helicopter has such a landing gear, however in the past the struts 7 and 17 nave been welded to the underside of the body at the center thereof and thus the entire landing gear has been conductively connected to the aircraft body. In accordance with the present invention the entire landing gear is conductively disconnected from the aircraft body by means of a pair of dielectric blocks 9 and 15 which are bolted or otherwise attached to the body 5 and to the struts 7 7 and 17. The center of one of the struts is arranged to form a feed point. In the VHF region, the two parallel struts then form the radiating elements of a folded dipole antenna, connected by the two skids 11 and 13. The skids themselves form capacitive end loading for the dipole, thus permitting lower frequency operation. In the lower HF band the landing gear antenna electrically resembles a loop antenna rather than a dipole. The attachment of the struts to the helicopter body by means of an insulator does not impair the mechanical strength of this assembly, since the load at this point on landing is mainly compressive and many insulators have excellent strength in compression. In practicing the invention each strut may comprise two separate parts, each supported by the dielectric block, as shown in FIG. 3. With this arrangement, the two confronting ends of strut 7 within the block 9 form the antenna terminals or feed point. The corresponding confronting ends of the rear strut 17 may be shorted together with a jumper wire (not illustrated, or an antenna tuner 18 may be connected between the two halves of this strut. If mechanical considerations rule out the use of the split struts of FIG. 3, each strut is made in one piece as shown in FIG. 4. With this arrangement, the folded dipole may be excited or fed by means of a ferrite-cored coil or transformer 10 which is placed in juxtaposition to the center of either one of the struts. The coil 10 may conveniently be embedded in the dielectric block which supports the strut. With this arrangement it is necessary to interpose an antenna tuner between the radio set (either a transmitter or receiver, or both) and the antenna. In FIG. 3 both struts and both dielectric blocks are shown cutaway and in FIG. 4 the rear dielectric block is shown cutaway to show the unitary strut construction.

The dimensions of the landing gear of the HU-1B are such that the antenna can operate in either the HF or VHF regions. The struts and skids are made of tubular metal. The struts are approximately 2½ inches in diameter and the skids approximately 4½ inches in diameter. These relatively large diameters result in a large bandwidth. This broadband feature permits the use of a smaller antenna tuner than would be required with an antenna composed of thin wires or tubes, such as are usually used on aircraft.

It can be seen from the above that the present invention provides a useful and efficient aircraft antenna without adding any appreciable weight, drag or exterior structure to the aircraft.

While the invention has been described in connection with specific embodiments, variations of the principles embodied herein will be obvious to those skilled in the art.

I claim:

1. A combined landing gear and antenna for a helicopter, comprising; a plurality of struts attached to the underside of said helicopter parallel to each other and perpendicular to the roll axis of said helicopter, said struts being insulated from the body of said helicopter, a pair of skids attached to the ends of said struts, and antenna feed means at the center of one of said struts, whereby said struts form a folded dipole with capacitive loading or said entire landing gear forms a loop antenna.

2. The apparatus of claim 1 wherein said struts are generally of arcuate shape and are attached to the underside of said helicopter by means of a dielectric block.

3. The apparatus of claim 1 wherein each of said struts comprises a single generally arcuate piece of tubular metal and said antenna is fed by means of a transformer in juxtaposition to the center of one of said struts.

4. The apparatus of claim 1 wherein each of said struts comprises separate parts, both being attached to a dielectric block mounted beneath the craft's roll axis on the underside of the body thereof, the confronting parts of one of said struts forming a feed point for said antenna, and an antenna tuner connected between the confronting parts of the other of said struts.

5. The apparatus of claim 1 wherein said landing gear forms said folded dipole with capacitive loading in the very high frequency (VHF) region and wherein said landing gear forms a loop antenna in the high frequency (HF) region.

6. A helicopter in which the landing gear thereof is of the skid type, means to insulate said landing gear from the fuselage of said helicopter, and means to couple a radio set to said landing gear, whereby said entire landing gear functions as an antenna.